COLLAR AND CUFF-LIKE GARMENT MEMBER AND METHOD OF MAKING IT

Original Filed Sept. 14, 1964

INVENTOR.
MANUEL A. THOMAS
BY
ATTORNEY

United States Patent Office

Re. 27,474
Reissued Sept. 5, 1972

27,474

COLLAR AND CUFF-LIKE GARMENT MEMBER AND METHOD OF MAKING IT

Manuel A. Thomas, Spartanburg, S.C., assignor to Deering Milliken Research Corporation, Spartanburg, S.C.

Original No. 3,448,462, dated June 10, 1969, Ser. No. 396,257, Sept. 14, 1964. Application for reissue Aug. 25, 1969, Ser. No. 853,572
Int. Cl. A41b *3/00, 7/00;* A41d *27/08;* D06m *15/38, 15/52*
U.S. Cl. 2—143 15 Claims

Matter enclosed in heavy brackets [ ] appears in the original patent but forms no part of this reissue specification; matter printed in italics indicates the additions made by reissue.

ABSTRACT OF THE DISCLOSURE

An abrasion resistant woven or knitted apparel fabric wherein the uppermost fibers of one face of the fabric are held tightly together by a polymeric coating composition. The fabric is further characterized in that a substantial number of yarns below the coated face thereof have the ability to move freely relative to adjacent yarns. The fabric is suitable for use in garment members such as collars, lapels, cuffs and the like.

This invention relates to abrasion resistant fabrics and more specifically to stiffened abrasion resistant plied fabrics suitable for use in garment members such as collars, lapels, cuffs and the like.

Stiffened garment sections such as shirt collars and the like are commonly prepared by fusing two sections of fabrics to an interiorly disposed plastic stiffener or by stitching two sections of fabric to an interiorly disposed stiffening fabric or by stitching together a plurality of fabric layers of substantially similar construction. Garment members prepared in the aforementioned manner still rely upon the outer fabric construction for abrasion resistance properties. For this reason, it is common to employ a heavier fabric in cuff, collar and lapel members and the like, than is employed in the body of a garment. The use of fabrics of varying weight in a garment often results in serious color matching, stitching and aesthetic problems.

It is therefore an object of this invention to prepare an abrasion resistant plied fabric that has the proper body and which may be employed in the preparation of garment sections without requiring extensive stitching operations.

It is another object of this invention to prepare abrasion resistant garment sections from garment body fabric.

In accordance with this invention, it has now been discovered that an abrasion resistant plied fabric that has the proper body and which is suitable for use in the manufacture of garment members may be prepared by depositing a polymeric composition on those yarns forming the face of a fabric, whereby only the uppermost fibers in these yarns are held tightly together by the [ploymeric] *polymeric* composition, the yarns themselves being relatively free to move, and then forming a continuous plied structure from the treated fabric. While any of a wide variety of coating techniques may be employed to deposit a polymeric composition on a single face of the fabric, a more detailed description of the preferred coating procedure may be seen in U.S. Patent No. 3,141,810. The polymeric composition is preferably a polymeric composition which will maintain its dimensional stability at temperatures above 300° F., that is to say, the polymeric composition should not be effected by those temperatures which are commonly employed in ironing cotton fabrics.

While the invention as described herein is suitable for use with any of the textile fabrics known to garment manufacturers, the preferred fabrics are the apparel fabrics such as shirting fabrics and more specifically cotton fabrics, cotton-rayon blend fabrics, cotton-polyester blend fabrics, cellulose ether fabrics, cellulose ester fabrics, rayon fabrics, nylon fabrics, polyester fabrics and the like. The coating composition may also be any coating composition may also be any coating composition which has the ability to retain its dimensional stability at elevated temperatures. Resins which have been found to be especially suitable for use as coating compositions in this invention are acrylic polymers, particularly blends of acrylic acid with lower alkyl acrylates, such as methyl and ethyl acrylate, polyurethanes, and aldehyde resin modified and alkylene oxide modified polyurethanes. The term polyurethane as employed herein is considered to include polyurethane prepolymers and combinations of reactive ingredients which are capable of forming polyurethanes in situ. In general, the resin coating should be applied to one face of the fabric in amounts of from about 2% by weight of the fabric to about 15% by weight of the fabric.

A better understanding of the invention may be had from a discussion of the drawings which are as follows.

Figure 1:
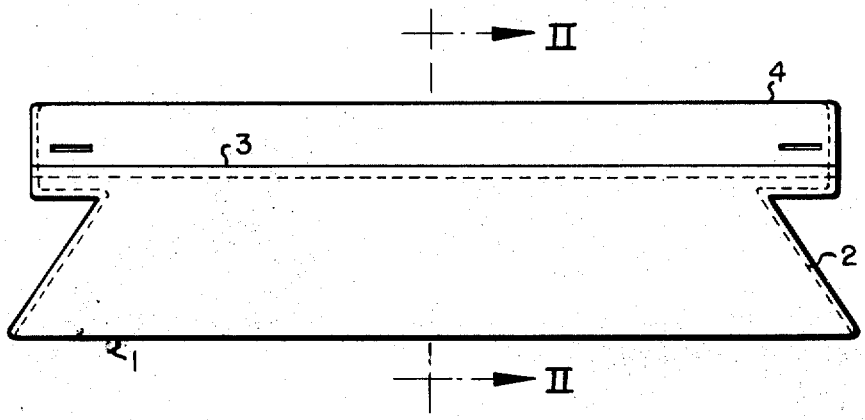
FIGURE 1 is a front view of an abrasion resistant stiffened collar member.
Figure 2:
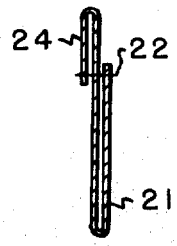
FIGURE 2 is a side view of the abrasion resistant stiffened collar member of FIGURE 1.

In FIGURE 1 a collar member 1 is illustrated, the collar being fashioned from a single fabric blank secured by stitches 2. The fabric blank is coated with an abrasion resistant coating composition on a single face. Collar member 1, therefore, has a coating on that portion of the collar which is below the plying juncture formed at juncture 3 while the tab portion 4 of the collar which is above juncture 3 is free of coating. A better understanding of the disposition of the coated surface may be had from a review of FIGURE 2 of the drawings which is a side view of FIGURE 1 taken along the line II, II. The exposed face of the main portion of collar member 21, that is to say that portion lying below stitch member 22, carries an abrasion resistant coating. That portion of collar member 21 which lies above stitch member 22, that is to say tab member 24, is free of coating material on the exposed face, the coated side having been turned inwardly.

Figure 3:
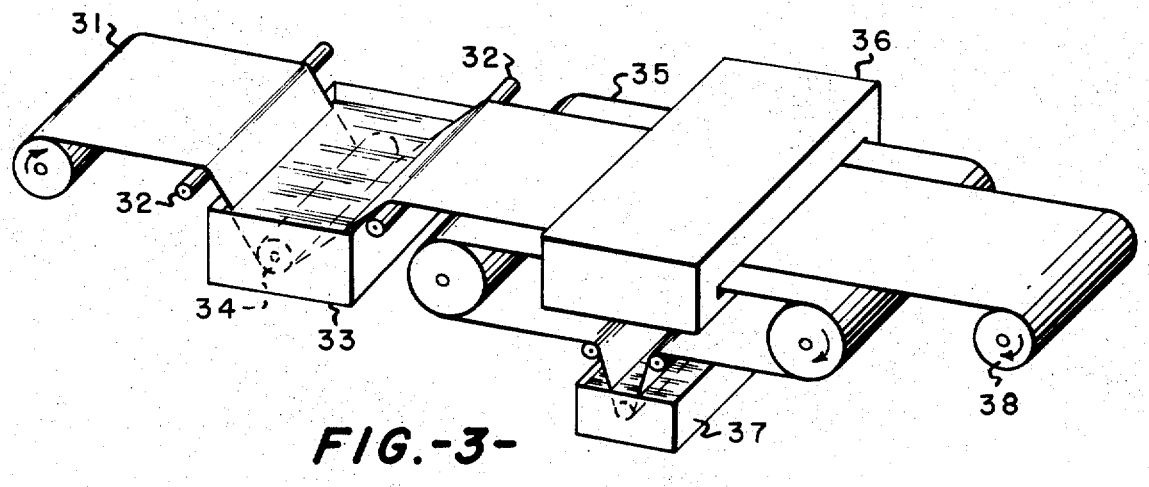
FIGURE 3 is a schematic diagram of one means for applying a coating suitable for producing abrasion resistant stiffened properties in a fabric.

In FIGURE 3 the fabric 31 is passed over suitable guide rolls 32 into a pad bath 33 containing a resinous coating composition. After passage under pad roll 34, the fabric is passed over suitable guide rolls 32 onto a continuous damp duck conveyer member 35. The pad pan coated fabric is passed over and in contact with an endless damp duck belt 35 and is dried by means of flash dryer 36. The technique is found to be such that the resinous impregnant migrates to that side opposite a damp duck continuous conveyor 35 and therefore results in a fabric having resins deposited on those yarns forming one face of the fabric. The conveyor member 35 is continuously maintained in a damp condition by passage through a water containing pad pan member 37. The finished fabric which is coated on a single face is then wound onto takeup roll 38.

It should be understood that other techniques may be employed for depositing the polymeric composition on one face of the fabric such as, for instance by a spraying technique, a knife coating technique or by pressure migration techniques such as sponging and the like.

The polymeric composition is preferably dried and at the same time cured at a temperature at which the composition coalesces to hold the fibers of the face yarns tightly together, but at a low enough temperature to avoid undue flowing of the composition into the fabric. The curing temperature, therefore, will generally lie within the range of temperatures at which the polymeric composition is plasticized. For the preferred polymeric compositions suitable for use in accordance with this invention, drying and curing is preferably effected by flash-drying the treated fabric at those elevated temperatures, preferably between about 100° and about 200° C., or even higher, up to about 300° C.

In this regard, it is preferred that the undried fabric does not contact an unyielding surface, such as a guide roll, prior to curing as the pressure will effect migration of the polymeric composition into the fabric, thereby necessitating more specialized drying techniques to obtain even fair results.

The location of the polymeric composition on the face yarns is facilitated in a specialized technique, wherein one of the two faces of the coated fabric is dried more rapidly. When this technique is utilized, the polymeric composition migrates only to the face yarns during the flash drying operation presumably because of the drying and temperature differentials between the faces of the fabric. It is believed that for this reason, the migration effect occurs to provide a fabric having the polymeric composition in the desired location.

The flash-drying medium may be any conventional drying apparatus, such as hot air ovens or infrared lamp arrays. Preferably an air circulating means is provided so that hot air is circulated through the fabric during drying.

Great care must be taken in applying the polymeric composition to the fabrics to insure that the material will be deposited properly on the face yarns. Total immersion of the fabric for extended periods of time, for example, invariably causes substantially complete impregnation of the fabric and the desirable characteristics of the fabric of this invention are not generally obtained. Spray techniques have been used with success but process conditions must be very carefully controlled. It is difficult, for example, to prevent the polymeric composition from flowing between the face yarns and into the fabric when this procedure is utilized. Clogging of the spray valves is not too uncommon, either, thereby resulting in uneven distribution of the polymeric composition on the fabric. By utilizing a polymeric composition medium of fairly low solids content, e.g., from about 1% to about 3% by weight solids, and by spraying the material onto a rapidly moving fabric, e.g., about 20–30 yds. per minute, the desired location of the polymeric composition may be obtained. The sprayed fabric is taken immediately from the spray chamber into an oven, heated to a temperature approximately the softening point of the polymeric composition to fix the polymeric composition in the desired location and to assist in preventing the migration of the polymeric composition into the fabric. The spraying procedure may be greately facilitated by running the fabric in a vertical manner and spraying the polymeric composition onto the vertically moving fabric from horizontally displaced spray guns.

The difficulties in controlling the spraying techniques are obviated, however, by applying the material, by means of a trough apparatus including an open-ended trough lined with a porous material, preferably of nylon, in such a manner that the porous material extends through the open end of the trough to form a bag-like protuberance. The lining material is of such a weave that the polymeric composition will not flow through except upon contact with the fabric to be treated. The pressure on the material caused by the running fabric is sufficient to release a limited amount of the polymeric composition evenly onto the fabric surface which contacts the bag. The fabric is then passed immediately into a curing zone and the polymeric composition is rapidly cured before undue impregnation of the fabric can occur.

Generally, it is preferred to apply the polymeric composition as an aqueous medium, such as an aqueous solution or emulsion. Improved drying is realized in some instances by dissolving or emulsifying the polymeric composition in an organic medium, such as the lower alkyl alcohols, methanol, ethanol and the like.

The following examples are given for purposes of illustration and should not be considered as limiting the spirit or scope of this invention:

Example I

A plain woven cotton broadcloth shirting fabric of 136 by 64 construction having a weight of about 2.65 yarns per lb. is knife coated at a 0 micrometer setting with a gardener knife employing a coating composition comprising 20% by weight Unithane 500 solids (polyurethane prepolymer marketed by Thiokol Chemical Company) and 10% by weight Unithane F5 solids (polyurethane prepolymer marketed by Thiokol Chemical Company) the knife coating technique being carried out in a manner such that one face of the fabric is completely coated without any of the coating composition striking through to the opposite face. The pickup of solids coating composition is about 11% by weight based on the dry weight of the fabric. The fabric is then dried and collar blanks are cut from the coated fabric. The collar blanks are then folded approximately in one half the edge portion of the blanks being foldede down to the central dividing portion in manner such that one-half presents two faces which expose the coating while the other half presents two faces which are free of coating. A tab member furnished by the blank is then stitched so as to secure the coated fabric in a manner whereby the coated surfaces form a garment collar while the uncoated surface forms a collar band. Collars prepared in this manner are found to have resilient abrasion resistant characteristics without being stiff. The collars are also found to withstand washing and ironing operations without any loss of their resilient characteristics.

Example II

The procedure of Example I was repeated with the exception that the coating composition was applied to a woven cotton oxford cloth shirting fabric of 88 by 50 construction having a weight of 2.85 yards per lb. Coating carried out in a manner such that a pickup of 14% by weight solids is obtained based on the dry weight of the fabric. The collars made from this material were also found to be able to withstand washing and ironing operations without any substantial loss in their resilient characteristics.

Example III

A plain woven cotton broadcloth fabric of 136 by 64 construction having a weight of about 2.65 yards per lb. is padded to about 100% wet pickup. The coating composition being 12% by weight Unithane 500 solids (polyurethane prepolymer prepared by Thiokol Chemical Company) and 7.8% Unithane F5 solids (polyurethane prepolymer prepared by Thiokol Chemical Company) in an aqueous carrier. The padded fabric is then placed on a damp duck fabric conveyor held on a pin frame and dried at about 160° C. for about 5 minutes in an oven. Samples are then cured at about 160° C. for about 2 minutes. Collar blanks are cut from the coated material which is found to have polyurethane deposited on a single face. The collar blanks are folded approximately in one half the edge portions of the blanks being folded down to the central dividing portion in a manner such that one-half presents two faces which expose the coating while the other half presents two faces which are free of coating. A tab member furnished by the blank is then stitched so as to secure the coating of the fabric in a manner whereby the coated surfaces form a garment collar while the uncoated surface forms a collar band. Collars prepared in this manner are found to have a resilient abrasion resisting characteristic without being stiff.

Example IV

The process set forth in Example III was repeated except that the coating operation was conducted on a woven cotton oxford cloth shirting fabric having a construction of 88 by 50 and a weight of about 2.85 yards per lb. Collars cut from the coated fabrics according to the manner set forth in Example III are found to have a resilient abrasion resistent characteristic without being stiff.

Example V

A polyester-cotton (65% polyester 35% cotton) shirting fabric of 136 by 64 construction was spray coated with with a latex composition comprising Rhoplex K3 (aqueous dispersion of acrylic polymers marketed by Rohm and Haas Chemical Company) in a manner such that one face of the fabric is completely coated without any of the coating composition striking through to the opposite face. The coating was carried out in a manner such that a pick-up of 8% by weight of latex was obtained on the dry fabrics. The fabric was dried and collar blanks are cut from the coated fabric. The collar blanks are then folded approximately in one half the edge portions of the blanks then being folded down to the central dividing portion in a manner such that one-half presents two faces which expose the coating while the other half presents two faces which are free of coating. A tab member furnished by the blank is then stitched so as to secure the coated fabric in a manner whereby the coated surfaces form a garment collar while the uncoated surface forms collar bands. The finished collars are found to have resilient abrasion resistent characteristics without being stiff and to retain these characteristics after repeated washing and ironing operation.

In order to evaluate the brasion resistent characteristics of the apparel fabrics prepared according to the method of this invention, abrasion tests were conducted according to the tests set forth in ASTM designation D1175D. In the test, fabric specimens are subjected to rotary rubbing action under controlled conditions of pressure and abrasive action. A Tabor abrasor apparatus manufactured by Tabor Instruments Company of North Tonawanda, New York, was employed equipped with a number CS–10 abrasion wheel carrying a 1000 gram load. The tests were run for a visual evaluation with the end point of each test being determined by the first surface yarn break. Tests carried out on the fabric, produced according to Example I, showed no breaks after 300 revolutions; the control, however, which was an identical uncoated fabric, showed numerous surface breaks after 300 revolutions. The oxford cloth fabric, prepared according to the method set forth in Example II, showed no breaks whatsoever after 300 revolutions, while the controlled fabric which was identical in all respects with the exception that it had not been coated, showed numerous breaks after 300 revolutions. The broadcloth shirting fabric prepared according to the method set forth in Example III showed no significant breaks after 500 revolutions while the control broadcloth fabric, which was identical in all respects with the exception that the coating was omitted, showed innumerable breaks after 300 revolutions. The oxford cloth shirting fabric, prepared according to the method set forth in Example IV, showed no significant breaks after 500 revolutions while the oxford cloth shirting fabric, which was identical in all respects with the exception that it had not been coated, showed numerous breaks after 300 revolutions.

Additional tests were run to evaluate the abrasion resistant characteristics of the apparel fabrics prepared according to the method of this invention, the tests being run according to ASTM Designation D1175–55TA (inflated diaphragm method). This method determines the resistance to abrasion of a specimen when the specimen is inflated over a rubber diaphragm under controlled air pressure and rubbed unidirectionally. The test apparatus employs electrical contact pins disposed on either side of the sample, the pins making contact when the unidirectional rubbing causes a break in the fabric thereby stopping the machine. This testing procedure showed that the broadcloth samples, prepared according to Example I, ran for 250 cycles while identical uncoated fabrics ran for 138 cycles. The oxford cloth fabric, prepared according to the method set forth in Example II, ran for 278 cycles while an identical uncoated fabric ran for 218 cycles. The broadcloth fabric, prepared according to Example III, ran for 175 cycles while identical uncoated fabrics ran for 138 cycles.

Having thus disclosed the invention what is claimed is:

1. A garment member comprising an abrasion resistant woven or knitted apparel fabric wherein the uppermost fibers of one face of said fabric are held tightly together by a polymeric coating and wherein a substantial number of yarns below said coated face have the ability to move freely relative to adjacent yarns, said fabric being folded to present a portion with two polymer coated faces of said garment member and being additionally folded to present a second portion of said garment member with two faces free of coating.

2. A garment member according to claim 1 wherein said polymeric coating on said fabric is dimensionally stable at temperatures of at least 300° F.

3. A garment member according to claim 1 wherein the polymeric coating is selected from a group consisting of polyurethane polymers and acrylic polymers.

4. A garment member according to claim 1 which is a garment cuff.

5. A garment member according to claim 1 which is a garment collar.

6. A garment collar member comprising a fabric including a tab portion folded to present two polymer coated faces, a band portion reverse folded to present two faces free of coating and stitching to retain said tab and band portions in said folded positions.

7. A garment collar member according to claim 6 wherein the uppermost fibers of one surface of said fabric are held tightly together by a polymeric coating and a substantial number of yarns below said coated surface have the ability to move freely relative to adjacent yarns.

8. A garment collar member according to claim 7 wherein said polymeric coating on said fabric is dimensionally stable at temperatures of at least 300° F.

9. A garment collar member according to claim 7 wherein the polymeric coating is selected from a group consisting of polyurethane polymers and acrylic polymers.

10. A process for the preparation of a garment member which comprises coating one surface of a fabric with a polymeric coating to tightly hold together the uppermost fibers of the coated surface of the fabric while a substantial number of yarns below the coated surface have the ability to move freely relative to adjacent yarns, folding a first portion of said fabric to form two polymer coated faces of said garment member, folding a second portion of said fabric to form two other faces of said garment member free of coating and stitching said coated fabric to retain said first and second portions in their folded positions.

11. A process according to claim 10 wherein said polymeric coating is selected from the group of polyurethane polymers and acrylic polymers.

12. A process according to claim 10 wherein said first portion is folded to form a collar tab portion and said second portion is folded to form a collar band portion.

*13. A process for concentrating a substance adjacent one surface of a textile fabric which comprises*

*(a) applying a substance in a liquid carrier to a first textile fabric,*

*(b) placing said first textile fabric in contact with a second textile fabric which has been dampened previously,*

*(c) applying heat directly to said first textile fabric and said second textile fabric simultaneously to remove said liquid carrier whereby said substatnce is caused*

*to become concentrated adjacent the surface of said first textile fabric opposite said second textile fabric, and*

(*d*) *separating said first textile fabric from said second textile fabric.*

*14. The process of claim 13 wherein said second textile fabric is a duck conveyor belt.*

*15. The process of claim 13 wherein the composition is an acrylic polymer and the liquid carrier is water.*

References Cited

The following references, cited by the Examiner, are of record in the patented file of this patent or the original patent.

UNITED STATES PATENTS

| | | | |
|---|---|---|---|
| 3,062,687 | 11/1962 | Camusi | 117—120 |
| 3,178,498 | 4/1965 | Brannock | 8—115.5 X |
| 3,202,541 | 8/1965 | Hochberg | 117—120 X |
| 3,293,071 | 12/1966 | Peloquin | 117—139.4 X |
| 3,445,277 | 5/1969 | Smith | 117—62 X |
| 2,035,245 | 3/1936 | Plotkin | 38—140 |
| 2,864,093 | 12/1958 | Summer et al. | 117—139.4 |
| 2,536,050 | 1/1951 | Fluck | 117—139.4 |
| 3,086,887 | 4/1963 | Habib | 117—139.5 |
| 3,220,869 | 11/1965 | Ruemens et al. | 117—139.4 |

| | | | |
|---|---|---|---|
| 3,248,259 | 4/1966 | Borsellino | 117—139.5 |
| 3,251,727 | 5/1966 | Reynolds et al. | 161—148 |
| 2,097,404 | 10/1937 | Geismar | 2—123 |
| 2,950,553 | 8/1960 | Hurwitz | 117—139.4 |
| 2,832,960 | 5/1958 | Rothbarth | 2—123 |
| 1,631,985 | 6/1927 | Roberts | 2—131 |
| 1,640,805 | 8/1927 | Rabell | 2—143 |
| 1,668,745 | 5/1928 | Tully | 2—143 |
| 2,467,438 | 4/1949 | McBurney | 2—143 |
| 2,650,212 | 8/1953 | Windemuth. | |
| 2,674,741 | 4/1954 | Donaldson | 2—131 |
| 3,301,741 | 1/1967 | Hendrickson et al. | 161—406 |

OTHER REFERENCES

Wakeman, Reginald L.: Chemistry of Commercial Plastics, Reinhold, New York (1947), pp. 469, 471, 472 relied on.

WILLARD E. HOAG, Primary Examiner

U.S. Cl. X.R.

2—123, 143, 243; 117—62, 139.4, 161 KP, 161 UB; 161—50, 102, 190, 231